United States Patent
Bai

(10) Patent No.: US 12,116,507 B2
(45) Date of Patent: Oct. 15, 2024

(54) SOLVENTLESS ADHESIVE COMPOSITION AND METHOD FOR PREPARING THE SAME

(71) Applicant: Dow Global Technologies LLC, Midland, MI (US)

(72) Inventor: Chenyan Bai, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 344 days.

(21) Appl. No.: 17/601,397

(22) PCT Filed: Apr. 4, 2019

(86) PCT No.: PCT/CN2019/081413
§ 371 (c)(1),
(2) Date: Oct. 4, 2021

(87) PCT Pub. No.: WO2020/199175
PCT Pub. Date: Oct. 8, 2020

(65) Prior Publication Data
US 2022/0186097 A1    Jun. 16, 2022

(51) Int. Cl.
| | |
|---|---|
| *C09J 175/06* | (2006.01) |
| *C08G 18/10* | (2006.01) |
| *C08G 18/12* | (2006.01) |
| *C08G 18/40* | (2006.01) |
| *C08G 18/42* | (2006.01) |
| *C08G 18/48* | (2006.01) |
| *C08G 18/76* | (2006.01) |
| *C09J 175/08* | (2006.01) |

(52) U.S. Cl.
CPC ............ *C09J 175/06* (2013.01); *C08G 18/12* (2013.01); *C08G 18/4018* (2013.01); *C08G 18/42* (2013.01); *C08G 18/4825* (2013.01); *C08G 18/7671* (2013.01); *C09J 175/08* (2013.01); *C08G 2170/00* (2013.01); *C09J 2301/162* (2020.08); *C09J 2301/30* (2020.08); *C09J 2475/00* (2013.01)

(58) Field of Classification Search
CPC ....... C09J 175/06; C09J 175/08; C08G 18/12; C08G 18/4018; C08G 18/42; C08G 18/4825
See application file for complete search history.

(56) References Cited

U.S. PATENT DOCUMENTS

| | | | |
|---|---|---|---|
| 11,365,278 B2 | 6/2022 | Blodau et al. |
| 2003/0215646 A1 | 11/2003 | Glasbrenner |
| 2016/0333155 A1 | 11/2016 | Bai et al. |
| 2017/0088758 A1 | 3/2017 | Bzowej et al. |
| 2017/0247588 A1 | 8/2017 | Bai |
| 2018/0044462 A1 | 2/2018 | Blodau et al. |
| 2020/0207903 A1 | 7/2020 | Bai et al. |

FOREIGN PATENT DOCUMENTS

| | | |
|---|---|---|
| CN | 102174308 A | 9/2011 |
| CN | 102627938 A | 8/2012 |
| CN | 103601867 | 8/2015 |
| CN | 104031225 | 11/2016 |
| CN | 107522839 A | 12/2017 |
| CN | 107709398 A | 2/2018 |
| CN | 108192072 A | 6/2018 |
| JP | A-H11-106733 A | 4/1999 |
| JP | A-2001-316443 A | 11/2001 |
| WO | 2015081486 A1 | 6/2015 |
| WO | 2017166003 A1 | 10/2017 |
| WO | 2017166005 A1 | 10/2017 |
| WO | 2018/140116 A1 | 8/2018 |
| WO | 2018/205221 A1 | 11/2018 |

OTHER PUBLICATIONS

PCT/CN2019/081413, International Preliminary Report on Patentability with a mailing date of Oct. 14, 2021.
PCT/CN2019/081413, International Search Report and Written Opinion with a mailing date of Dec. 23, 2019.
PCT/IN2021/17045816 Examination Report Dated Jul. 21, 2023.

*Primary Examiner* — Michael L Leonard
(74) *Attorney, Agent, or Firm* — Boyle Fredrickson, S.C.

(57) ABSTRACT

A solventless adhesive composition is provided. The solventless adhesive composition comprises (A) an isocyanate prepolymer having a side chains represented by —$R_2$—(O—$R_1$—O)$_n$—$R_3$ and (B) an isocyanate-reactive component, and exhibits improved bond strength, heat seal strength, adhesive COF property and optical appearance. A laminate product prepared with said solventless adhesive composition as well the method for preparing the laminate product are also provided.

13 Claims, No Drawings

SOLVENTLESS ADHESIVE COMPOSITION AND METHOD FOR PREPARING THE SAME

FIELD OF THE INVENTION

The present disclosure relates to a solventless adhesive composition and a method for preparing the same, a laminate product comprising an adhesive layer derived from the solventless adhesive composition and a method for preparing the same. The adhesive layer prepared with said solventless adhesive composition exhibits improved bond strength, heat seal strength, adhesive COF property and optical appearance.

BACKGROUND

Adhesive compositions are useful for a wide variety of applications. For instance, they can be used to bond substrates such as polyethylenes, polypropylenes, polyesters, polyamides, metals, papers, or cellophanes to form composite films, i.e., laminates. The use of adhesives in different laminating end-use applications is generally known. For example, adhesives can be used in the manufacture of film/film and film/foil laminates commercially used in the packaging industry, especially for food packaging. The adhesives used in laminating applications are known as "laminating adhesives" and can be generally classified into three categories: solvent-based, water-based, and solventless. The performance of an adhesive may vary based on the category of the adhesive and the application in which the adhesive is applied.

Solventless laminating adhesives may comprise up to 100% solids, i.e. without either organic solvents or aqueous carriers. As no organic solvent or water has to be removed from the adhesive upon application, these adhesives can be applied with high line speeds and are preferable in applications requiring quick adhesive application. Solvent-based and water-borne laminating adhesives are limited by the rate at which the solvent or water carrier can be effectively dried and removed upon application. For environmental, health, and safety reasons, laminating adhesives are preferably aqueous or solventless. Various kinds of solventless laminating adhesives have been reported, and many researches have been made on the two-component polyurethane-based laminating adhesives. Typically, a two-component polyurethane-based laminating adhesive includes a first component comprising an isocyanate-containing prepolymer and a second component comprising one or more polyols. The first component is obtained by the reaction of an isocyanate monomer with an isocyanate-reactive compound such as a polyether polyol and/or a polyester polyol. The second component is an isocyanate-reactive compound such as a polyether polyol and/or a polyester polyol. Each component can optionally include one or more additional additives. The two components are combined in a predetermined ratio and applied on a film/foil substrate, which is then laminated to another film/foil substrate.

Nevertheless, the above stated two-component solventless polyurethane-based laminating adhesives exhibit several disadvantages when compared to traditional solvent-borne adhesives, such as high initial viscosity, weak initial bonds and slow bond development before the laminate can be processed. In addition, these adhesives tend to exhibit relatively poor chemical resistance, especially in acidic conditions. In some instances, a silane adhesion promoter is incorporated in the adhesive composition to improve bond strength. However, the silane adhesion promoters cannot withstand acid resistance, and the bond strength of the adhesive composition will significantly deteriorate after acid treatment. Further, laminates incorporating silane adhesion promoters require dry storage environments as silane is sensitive to moisture.

For the above reasons, two-component solventless polyurethane-based laminating adhesive compositions with decreased initial viscosity, improved bond strength, chemical resistance, and heat seal strength, and methods of making the same, are desirable.

After persistent exploration, we have surprisingly found a solventless polyurethane adhesive composition which can achieve one or more of the above targets.

SUMMARY OF THE INVENTION

The present disclosure provides a unique solventless polyurethane adhesive composition and a laminate product prepared by using the same.

In a first aspect of the present disclosure, the present disclosure provides a solventless adhesive composition, comprising:

(A) an isocyanate component comprising a prepolymer which is derived from the reaction of (i) one or more isocyanate compounds comprising at least two isocyanate groups with (ii) one or more first isocyanate-reactive compounds having at least two isocyanate-reactive groups and at least one side chains represented by Formula I and (iii) one or more second isocyanate-reactive compounds having at least two isocyanate-reactive groups and not having the side chain represented by Formula I:

—R$_2$—(O—R$_1$—O)$_n$—R$_n$      Formula I wherein R$_1$ represents a C$_2$ to C$_4$ alkylene group, R$_2$ is a C$_1$ to C$_6$ alkylene group, and R3 is a C$_1$ to C$_6$ alkyl; and n is an integer of 8 to 25;

wherein the prepolymer comprises at least two free isocyanate groups; and (B) an isocyanate-reactive component comprising one or more third isocyanate-reactive compounds having at least two isocyanate-reactive groups, wherein the third isocyanate-reactive compound is different from the first isocyanate-reactive compound. The (B) isocyanate-reactive component may optionally comprise a fourth isocyanate-reactive compound which is identical with the first isocyanate-reactive compound.

In a second aspect of the present disclosure, the present disclosure provides a laminate product comprising at least two substrates and an adhesive layer sandwiched therebetween, wherein the adhesive layer is formed by the reaction between the (A) isocyanate component and the (B) isocyanate-reactive component of the solventless adhesive composition of the present disclosure.

In a third aspect of the present disclosure, the present disclosure provides a process for preparing the laminate product, comprising the steps of providing the solventless adhesive composition of the present disclosure; applying the solventless adhesive composition onto a surface of a first substrate; applying a second substrate onto the surface of the adhesive layer on the first substrate to form laminates; and then, curing the whole laminates.

It is to be understood that both the foregoing general description and the following detailed description are exemplary and explanatory only and are not restrictive of the invention, as claimed.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, "and/or" means "and, or as an alternative". All ranges include endpoints unless otherwise indicated.

According to an embodiment of the present disclosure, the solventless adhesive composition is a "two-part" or "two-package" composition comprising an isocyanate component (A) of urethane prepolymer and an isocyanate-reactive component (B). The prepolymer in said component (A) comprises an alkylene oxide side chain which imparts desirable improved properties to the adhesive composition and the adhesive layer prepared therefrom. According to a preferable embodiment, the isocyanate component (A) and the isocyanate-reactive component (B) are transported and stored separately, combined shortly or immediately before being applied during the manufacture of the laminate product.

The prepolymer contained in the isocyanate component (A) is a urethane prepolymer formed by the reaction of (i) one or more isocyanate compounds comprising at least two isocyanate groups with (ii) one or more first isocyanate-reactive compounds having at least two isocyanate-reactive groups and at least one side chains represented by Formula I and (iii) one or more second isocyanate-reactive compounds having at least two isocyanate-reactive groups and not having the side chain represented by Formula I:

Formula I wherein $R_1$ represents a $C_2$ to $C_4$ alkylene group, $R_2$ is a $C_1$ to $C_6$ alkylene group, and R3 is a $C_1$ to $C_6$ alkyl; and n is an integer of 8 to 25; wherein the prepolymer comprises at least two free isocyanate groups.

In various embodiments, the (i) one or more isocyanate compounds are also known as "polyisocyanate compounds" and comprise at least two isocyanate groups has an average isocyanate functionality of at least about 2.0, preferably from about 2 to 7, more preferably from about 2 to about 5, and most preferably from about 2 to about 4. Suitable polyisocyanate compounds include aromatic, aliphatic, cycloaliphatic and araliphatic polyisocyanates having two or more isocyanate groups. In a preferable embodiment, the polyisocyanate compounds are selected from the group consisting of $C_4$-$C_{12}$ aliphatic polyisocyanates comprising at least two isocyanate groups, $C_6$-$C_{15}$ cycloaliphatic or aromatic polyisocyanates comprising at least two isocyanate groups, $C_7$-$C_{15}$ araliphatic polyisocyanates comprising at least two isocyanate groups, and combinations thereof. In another preferable embodiment, suitable polyisocyanate compounds include m-phenylene diisocyanate, 2,4-toluene diisocyanate and/or 2,6-toluene diisocyanate (TDI), the various isomers of diphenylmethanediisocyanate (MDI), carbodiimide modified MDI products, hexamethylene-1,6-diisocyanate, tetramethylene-1,4-diisocyanate, cyclohexane-1,4-diisocyanate, hexahydrotoluene diisocyanate, hydrogenated MDI, naphthylene-1,5-diisocyanate, isophorone diisocyanate (IPDI), or mixtures thereof.

According to an embodiment of the present disclosure, the (i) isocyanate compound is an "aromatic isocyanate" contains one or more aromatic rings. According to an alternative embodiment of the present disclosure, isocyanate compounds suitable for use according to this disclosure can be selected from the group consisting of aromatic isocyanates, aliphatic isocyanates, carbodiimide modified isocyanates, and the combinations thereof. Examples of aromatic isocyanates suitable for use according to this disclosure include, but are not limited to, isomers of methylene diphenyl dipolyisocyanate ("MDI") such as 4,4-MDI, 2,4-MDI and 2, 2'-MDI, or modified MDI such as carbodiimide modified MDI or allophanate modified MIDI; isomers of toluene-dipolyisocyanate ("TDI") such as 2,4-TDI, 2,6-TDI, isomers of naphthalene-dipolyisocyanate ("NDI") such as 1, 5-NDI, and combinations thereof. Examples of aliphatic isocyanates suitable for use according to this disclosure include, but are not limited to, isomers of hexamethylene dipolyisocyanate ("HDI"), isomers of isophorone dipolyisocyanate ("IPDI"), isomers of xylene dipolyisocyanate ("XDI"), and combinations thereof.

Compounds having isocyanate groups, such as the (i) isocyanate compound or the isocyanate prepolymer, may be characterized by the parameter "% NCO" which is the amount of isocyanate groups by weight based on the weight of the compound. The parameter % NCO can be measured by the method of ASTM D 2572-97 (2010). According to an embodiment of the present disclose, the disclosed isocyanate compound has a % NCO of at least 3 wt %, or at least 5 wt %, or at least 7 wt %. In some embodiments, the isocyanate compound has a % NCO not to exceed 30 wt %, or 25 wt %, or 22 wt %, or 20 wt %.

According to an embodiment of the present disclosure, the (i) one or more isocyanate compounds are used at a stoichiometrically excessive amount with relative to the first and second isocyanate-reactive compounds during the preparation of the prepolymer so that the resultant polymer comprises free isocyanate groups for the further reaction with the isocyanate-reactive component (B). According to an embodiment of the present disclosure, the content of the (i) isocyanate compound is from 30 wt % to 65 wt %, with the combined weight of the isocyanate compound, the first isocyanate-reactive compound and the second isocyanate-reactive compound, and preferably, the total weight of the isocyanate component (A), being taken as 100 wt %. According to a preferable embodiment of the present disclosure, the content of the (i) isocyanate compound can be in the numerical range obtained by combining any two of the following end point values: 27 wt %, 30 wt %, 33 wt %, 35 wt %, 40 wt %, 45 wt %, 50 wt %, 55 wt %, 60 wt %, 65 wt % and 70 wt %.

Two different isocyanate-reactive compounds react with the above stated isocyanate compound to produce the urethane prepolymer, wherein the first isocyanate-reactive compound has a side chain comprising poly(alkylene oxide) moiety which will be introduced into the urethane prepolymer, and consequently into the polyurethane formed by reacting the component (A) with the component (B), and the second isocyanate-reactive compound does not have said side chain comprising poly(alkylene oxide) moiety. According to a preferable embodiment of the present application, the first isocyanate-reactive compound is a polyol represented by Formula II:

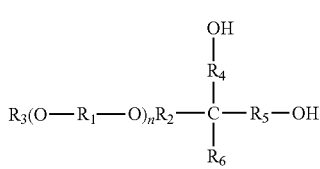

Formula II wherein $R_1$ represents a $C_2$ to $C_4$ alkylene group or a $C_2$ to $C_3$ alkylene group; $R_2$ is a $C_1$ to $C_6$ alkylene group, a $C_1$ to $C_5$ alkylene group, a $C_1$ to $C_4$ alkylene group, a $C_1$ to $C_3$ alkylene group or a $C_1$ to $C_2$ alkylene group; $R_3$ is a $C_1$ to $C_6$ alkyl, a $C_1$ to $C_5$ alkyl, a $C_1$ to $C_4$ alkyl, a $C_1$ to $C_3$ alkyl or a $C_1$ to $C_2$ alkyl; n is an integer of 8 to 25, 9 to 22, 10 to 20, 12 to 18 or 14 to 16; $R_4$ and $R_5$ independently represent $C_1$ to $C_6$ alkylene group, a $C_1$ to $C_5$ alkylene group, a $C_1$ to $C_4$ alkylene group, a $C_1$ to $C_3$ alkylene group or a $C_1$ to $C_2$ alkylene group; and $R_6$ represents a $C_1$ to $C_6$ alkyl, a $C_1$ to $C_5$ alkyl, a $C_1$ to $C_4$ alkyl, a $C_1$ to $C_3$ alkyl or a $C_1$ to $C_2$ alkyl. According to a preferable embodiment of the present disclosure, $R_1$ is an ethylene group, $R_2$ is a methylene, each of $R_3$, $R_4$ and $R_5$ is a methyl, and $R_6$ is an ethyl. According to an embodiment of the present disclosure, the content of the (ii) first isocyanate-reactive compound is from 2 wt % to 30 wt %, with the combined weight of the isocyanate compound, the first isocyanate-reactive compound and the second isocyanate-reactive compound, and preferably, the total weight of the isocyanate component (A), being taken as 100 wt %. According to a preferable embodiment of the present disclosure, the content of the (i) first isocyanate-reactive compound can be in the numerical range obtained by combining any two of the following end point values: 1 wt %, 2 wt %, 3 wt %, 4 wt %, 6 wt %, 8 wt %, 10 wt %, 12 wt %, 14 wt %, 16 wt %, 18 wt %, 20 wt %, 22 wt %, 24 wt %, 26 wt %, 28 wt %, 30 wt % and 32 wt %.

It's noted that the first isocyanate-reactive compound (ii) can be directly mixed with the isocyanate compound (i) and the second isocyanate-reactive compound (iii) to form the prepolymer. Alternatively, the first isocyanate-reactive compound (ii) may be combined with the second isocyanate-reactive compound (iii) and then react with the isocyanate compound (i) to form the prepolymer.

The second isocyanate-reactive compound is different from the first isocyanate-reactive compound in that it does not comprise a side chain comprising poly(alkylene oxide) moiety. For example, when the second isocyanate-reactive compound is a polyether polyol, it will inevitably comprise poly(alkylene oxide) moiety, but the poly(alkylene oxide) moiety is included in the main chain and is terminated with at least two hydroxyl groups instead of being included in a side chain and thus is different from the first isocyanate-reactive compound in the molecular structure.

In various embodiments of the present disclosure, the second isocyanate-reactive compound comprises one or more polyols selected from the group consisting of polyester polyols, polyether polyols, polycarbonate polyols, a blend of said polyester polyols and polyether polyols, and a combination thereof. Besides, monomeric polyfunctional alcohols, such as aliphatic polyhydric alcohols comprising at least two hydroxy groups, cycloaliphatic or aromatic polyhydric alcohols comprising at least two hydroxy groups, araliphatic polyhydric alcohols comprising at least two hydroxy groups, may be additionally included. Preferably, the polyol is selected from the group consisting of polyester polyols having a molecular weight from 400 to 5,000 g/mol, polyether polyols having a molecular weight from 400 to 5,000 g/mol, and combinations thereof. According to a preferable embodiment, the polyol exclusively comprises a polyester polyol or a polyether polyol. Furthermore, monomeric polyfunctional alcohols, such as $C_2$-$C_{16}$ aliphatic polyhydric alcohols comprising at least two hydroxy groups, $C_6$-$C_{15}$ cycloaliphatic or aromatic polyhydric alcohols comprising at least two hydroxy groups, $C_7$-$C_{15}$ araliphatic polyhydric alcohols comprising at least two hydroxy groups, may be included as supplemental isocyanate-reactive compounds.

In an embodiment of the present disclosure, the second isocyanate-reactive compound comprises a mixture of two or more different polyols, such as a mixture of two or more polyether polyols, a mixture of two or more polyester polyols, a mixture of at least one polyether polyols with at least one polyester polyols, or a mixture of a polyester polyol/a polyether polyol and a monomeric polyol.

In a preferable embodiment, the second isocyanate-reactive compound is a polyester polyol having a molecular weight from 500 to 5,000 g/mol, preferably from 600 to 3,000 g/mol. The polyester polyol is typically obtained by reacting polyfunctional alcohols having from 2 to 12 carbon atoms, preferably from 2 to 10 carbon atoms, with polyfunctional carboxylic acids having from 2 to 12 carbon atoms, preferably 2 to 10 carbon atoms, or anhydrides/esters thereof. Typical polyfunctional alcohols for preparing the polyester polyol are preferably diols or triols and include ethylene glycol, propylene glycol, butylene glycol, pentylene glycol or hexylene glycol. Typical polyfunctional carboxylic acids can be aliphatic, cycloaliphatic, araliphatic, aromatic or heterocyclic and may be substituted, for example with halogen atoms, and/or may be saturated or unsaturated. Preferably, the polyfunctional carboxylic acids are selected from the group consisting of suberic acid, azelaic acid, phthalic acid, isophthalic acid, phthalic anhydride, tetrahydrophthalic anhydride, hexahydrophthalic anhydride, tetrachlorophthalic anhydride, endomethylene-tetrahydro-phthalic anhydride, glutaric anhydride, alkenylsuccinic acid, maleic acid, maleic anhydride, fumaric acid, dimeric fatty acids. Preference is given to dicarboxylic acids represented the general formula HOOC—$(CH_2)_y$—COOH, where y is an integer from 1 to 10, preferably an even number from 2 to 10. The polyester polyol is preferably terminated with at least two hydroxyl groups. In a preferable embodiment, the polyester polyol has a hydroxyl functionality of 2 to 4, preferably from 2 to 3. In another embodiment, the polyester polyol has a OH number of 30 to 200 mgKOH/g, preferably from 40 to 180 mgKOH/g, and more preferably from 50 to 160 mgKOH/g. Various molecular weights are contemplated for the polyester polyol. For example, the polyester polyol may have a number average molecular weight of from about 500 g/mol to about 5,000 g/mol, preferably from about 600 g/mol to about 3,000 g/mol, more preferably from about 700 g/mol to about 2,000 g/mol.

Alternatively, the polyester polyol includes lactone-based polyester diols, which are homopolymers or copolymers of lactones, preferably terminal hydroxyl-functional addition products of lactones with suitable difunctional initiator molecules. Preferred lactones are derived from compounds represented by the general formula HO—$(CH_2)_z$—COOH, where z is an integer from 1 to 20 and one hydrogen atom of a methylene unit may also be replaced by a $C_1$ to $C_4$ alkyl radical. Exemplary lactone-based polyesterdiols include ε-caprolactone, β-propiolactone, γ-butyrolactone, methyl-ε-caprolactone or mixtures thereof.

In another preferable embodiment, the second isocyanate-reactive compound is a polyether polyol having a functionality (average number of isocyanate-reactive groups, particularly, hydroxyl group, in a polyol molecule) of 1.8 to 3.0 and a weight average molecular weight (Mw) of 400 to 5,000 g/mol, preferably from 500 to 4,000 g/mol, more preferably from 600 to 3,000 g/mol. The polyether polyols is generally prepared by polymerization of one or more alkylene oxides selected from propylene oxide (PO), ethylene oxide (EO), butylene oxide, tetrahydrofuran and mixtures thereof.

In general, the content of the second isocyanate-reactive compound used in the preparation of the prepolymer may range from about 10 wt % to 30 wt %, with the combined weight of the isocyanate compound, the first isocyanate-reactive compound and the second isocyanate-reactive compound, and preferably, the total weight of the isocyanate component (A), being taken as 100 wt %. According to a preferable embodiment of the present disclosure, the content of the (ii) second isocyanate-reactive compound can be in the numerical range obtained by combining any two of the following end point values: 8 wt %, 10 wt %, 12 wt %, 15 wt %, 18 wt %, 20 wt %, 22 wt %, 25 wt %, 28 wt %, 30 wt % and 32 wt %.

The isocyanate-reactive component (B) comprises one or more third isocyanate-reactive compounds having at least two isocyanate-reactive groups, wherein the third isocyanate-reactive compound is different from the first isocyanate-reactive compound and it does not comprise a side chain comprising poly(alkylene oxide) moiety. For example, when the third isocyanate-reactive compound is a polyether polyol, it will inevitably comprise poly(alkylene oxide) moiety, but the poly(alkylene oxide) moiety is included in the main chain and is terminated with at least two hydroxyl groups instead of being included in a side chain. The third isocyanate-reactive compound may comprise one or more of the above stated isocyanate-reactive compounds for the second isocyanate-reactive compound.

According to a preferable embodiment of the present disclosure, the isocyanate-reactive component (B) is a blend of one or more polyether polyols with one or more polyester polyols, wherein the polyether polyols and the polyester polyols are independently selected from those used for the second isocyanate-reactive compounds. According to a preferable embodiment of the present disclosure, the one or more third isocyanate-reactive compounds comprise a blend of 50-80 wt % polyester polyol and 20-40 wt % polyether polyol, with the total weight of the isocyanate-reactive component (B) being taken as 100 wt %.

According to an alternative embodiment of the present disclosure, the isocyanate-reactive component (B) may further comprise one or more fourth isocyanate-reactive compounds having at least two isocyanate-reactive groups and a side chain comprising poly(alkeylene oxide) moiety, and may comprise one or more of the compounds for the above stated first isocyanate-reactive compounds. The amount of the fourth isocyanate-reactive compound, when presented, may be from 0.01 wt % to 20 wt %, with the total weight of the isocyanate-reactive component (B) being taken as 100 wt %. According to a preferable embodiment of the present disclosure, the content of the fourth isocyanate-reactive compound can be in the numerical range obtained by combining any two of the following end point values: 0.005 wt %, 0.01 wt %, 0.02 wt %, 0.05 wt %, 0.1 wt %, 0.2 wt %, 0.5 wt %, 1 wt %, 5 wt %, 8 wt %, 10 wt %, 12 wt %, 15 wt %, 17 wt %, 20 wt % and 22 wt %, based on the total weight of the isocyanate-reactive component (B).

According to various embodiments of the present disclosure, the weight ratio between the isocyanate component (A) and the ioscyanate-reactive component (B) is from 100:30 to 100:100. According to a preferable embodiment, said weight ratio can be in the numerical range obtained by combining any two of the following ratios: 100:30, 100:40, 100:50, 100:60, 100:70, 100:80, 100:90, and 100:100.

As stated above, the isocyanate component (A) mainly comprises a urethane prepolymer prepared by the polymerization reaction between the isocyanate compound (i) and the first/second isocyanate-reactive compounds. The isocyanate component (A) and the isocyanate-reactive component (B) are transported and stored separately, combined shortly or immediately before being applied during the manufacture of the lamination. In some embodiments, both the isocyanate component and the polyol component are each liquid at ambient temperature. When it is desired to use the adhesive composition, the isocyanate component and the isocyanate-reactive (preferably, polyol) component are brought into contact with each other and mixed together. Once mixed, polymerization (curing) reaction occurs between the free isocyanate groups in the isocyanate component (A) (and preferably the urethane prepolymer) and the isocyanate groups (especially, hydroxyl groups) in the isocyanate-reactive component (B) to form a polyurethane which exhibit the function of adhesive in the adhesive layer between two or more substrates. The adhesive composition formed by bringing the two components into contact can be referred to as a "curable mixture".

The disclosed isocyanate-reactive (polyol) compounds may optionally further comprise a bio-based polyol, such as castor oil or other bio-based polyols. The disclosed bio-based polyol has a hydroxyl group functionality of at least 1.5 and not to exceed 4 (i.e., 1.5 f 4). When optionally included in the isocyanate-reactive (polyol) component (B), the amount of the bio-based polyol in the component (B) is, by weight based on the weight of the polyol component, at least 0.01 wt %, or at least 0.1 wt %, or at least 3 wt %. The amount of the bio-based polyol in the component (B) is not to exceed, by weight based on the weight of the component (B), 15 wt %, or 10 wt %, or 5 wt %. When the bio-based polyol is optionally included in the isocyanate-reactive (polyol) compounds used in the preparation of the prepolymer in the isocyanate component (A), the amount of the bio-based polyol in the isocyanate component (A) is, by weight based on the weight of the isocyanate component (A), at least 0.01 wt %, or at least 0.1 wt %, or at least 3 wt %. The amount of the bio-based polyol in the isocyanate component is not to exceed, by weight based on the weight of the isocyanate component (A), 15 wt %, or 10 wt %, or 5 wt %.

One or more catalysts may be optionally used to promote or accelerate the above stated polymerization reaction for preparing the prepolymer in the isocyanate component (A) and/or the polymerization between the prepolymer of (A) and the isocyanate-reactive component (B).

The catalyst may include any substance that can promote the reaction between the isocyanate group and the isocyanate-reactive group. Without being limited to theory, the catalysts can include, for example, glycine salts; tertiary amines; tertiary phosphines, such as trialkylphosphines and dialkylbenzylphosphines; morpholine derivatives; piperazine derivatives; chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; acidic metal salts of strong acids such as ferric chloride and stannic chloride; salts of organic acids with variety of metals, such as alkali metals, alkaline earth metals, Al, Sn, Pb, Mn, Co, Ni and Cu; organotin compounds, such as tin(II) salts of organic carboxylic acids, e.g., tin(II) diacetate, tin(II) dioctanoate, tin(II) diethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate; bismuth salts of organic carboxylic acids, e.g., bismuth octanoate; organometallic derivatives of trivalent and pentavalent As, Sb and Bi and metal carbonyls of iron and cobalt; or mixtures thereof.

In general, the content of the catalyst used herein is larger than zero and is at most 1.0 wt %, preferably at most 0.5 wt %, more preferably at most 0.05 wt %, based on the total weight of all the reactants.

The adhesive composition of the present disclosure may optionally comprise any additional auxiliary agents and/or additives for specific purposes.

In one embodiment of the present disclosure, one or more of the auxiliary agents and/or additives may be selected from the group consisting of other co-catalysts, surfactants, toughening agents, flow modifiers, adhesion promoters, diluents, stabilizers, plasticizers, catalyst de-activators, dispersing agents and mixtures thereof.

A method of forming a laminate using said adhesive composition is also disclosed. In some embodiments, the adhesive composition, such as the adhesive composition discussed above, is in a liquid state. In some embodiments, the composition is a liquid at 25° C. Even if the composition is solid at 25° C., it is acceptable to heat the composition as necessary to convert it into a liquid state. A layer of the composition is applied to a surface of a substrate or a film. A "substrate/film" is any structure that is 0.5 mm or less in one dimension and is 1 cm or more in both of the other two dimensions. A polymer film is a film that is made of a polymer or mixture of polymers. The composition of a polymer film is, typically, 80 percent by weight or more by weight one or more polymers. In some embodiments, the thickness of the layer of the curable mixture applied to the film is 1 to 5 μm.

In some embodiments, a surface of another substrate/film is brought into contact with the layer of the curable mixture to form an uncured laminate. The adhesive composition may be applied by conventional solvent-less machine, e.g. Labo-Combi 400 machine from Nordmeccanica. The curable mixture is then cured or allowed to cure. The uncured laminate may be subjected to pressure, for example by passing through nip rollers, which may or may not be heated. The uncured laminate may be heated to speed the cure reaction. Suitable substrates/films include paper, woven and nonwoven fabric, metal foil, polymers, and metal-coated polymers. Films optionally have a surface on which an image is printed with ink; the ink may be in contact with the adhesive composition. In some embodiments, the substrates/films are polymer films or metal-coated polymer films, and more preferred are polymer films.

The process of the present disclosure may be carried out continuously or batchwise. An example of the continuous process is a roll to roll process, in which a roll of a first substrate/film is unwound and transmitted through two or more work station where the isocyanate component (A) and the isocyanate-reactive component (B) are mixed to form the adhesive composition (curable mixture) of the present application which is applied onto a surface of the first substrate/film. The adhesive composition (curable mixture) of the present application can be applied more than once to achieve a desirable film thickness or composition profile. A second substrate/film may be applied onto the uncured adhesive layer with or without the aid of rollers. Heating or irradiation devices may be arranged to promote the curing of the coated adhesive layer, and rollers can also be used for enhancing the adhesion strength within the laminate. The second substrate/film can be identical with or different from the first substrate/film and can also be unwound from a roll. The unwound substrates/films are generally from 10 to 20,000 meters, from 10 to 15,000 meters and preferably from 20 to 10,000 meters in length and are typically transmitted at a speed in the range from 0.1 to 60 m/min, preferably from 3 to 45 m/min, more preferable from 5 to 15 m/min. In the end of the continuous technology, the cured laminate product is wound up on a spindle.

The laminate product disclosed herein can be cut or otherwise shaped so as to have a shape suitable for any desired purpose, such as packaging material.

EXAMPLES

Some embodiments of the invention will now be described in the following Examples, wherein all parts and percentages are by weight unless otherwise specified. However, the scope of the present disclosure is not, of course, limited to the formulations set forth in these examples. Rather, the Examples are merely inventive of the disclosure.

The information of the raw materials used in the examples is listed in the following table 1:

TABLE 1

| Raw materials used in the examples | | | |
|---|---|---|---|
| Component | Grade name | Characterization | Vendor |
| Polyol | PPG1000 | Poly(propylene oxide) | The Dow Chemical Company |
|  | Bester 648 | polyester polyol | The Dow Chemical Company |
|  | Ymer N120 | A polyol haying a side chain comprising an poly(alkylene oxide) moiety | Perstrop |
|  | MF C99 | A polyol mixture of a polyester polyol and a polyether polyol | The Dow Chemical Company |
| Isocyanate | Isonate 125M | Methylene diphenyl diisocyanate | The Dow Chemical Company |
|  | Isonate 50 OP | Methylene diphenyl diisocyanate (MDI) with 50% 2,4-MDI | The Dow Chemical Company |

Isocyanate Components (urethane prepolymer) of Examples (Ex.) 1 to 4 and Comparative Examples (CEx.) 1 to 2 are synthesized according to the procedure described below using the relative contents of raw materials listed in Table 2, in percentage by weight based on total weight of the isocyanate component.

The Isocyanate Components (urethane prepolymers) are synthesized in a 1 L glass reactor according to a typical polyurethane prepolymer preparation process. In particular, the isocyanate monomer as shown in Table 2 is introduced into the reactor and maintained at 60° C. with nitrogen protection. Then, the polyols shown in Table 2 are introduced into the reactor. The temperature is slowly increased to 80° C. and maintained for 2 to 3 hours. The produced urethane prepolymer, i.e., the isocyanate component, is charged into a sealed container with nitrogen protection for further application.

TABLE 2

Formulations for the Preparation of the Isocyanate Components

| | Composition information | | | | | |
|---|---|---|---|---|---|---|
| | Isonate 50 OP | Isonate 125M | Bester 648 | PPG-1000 | Ymer N120 | Viscosity (25° C.) |
| Ex.1 | 58 | | | 32 | 10 | 1600 cp |
| Ex.2 | 58 | | | 26 | 16 | 1200 cp |
| CEx.1 | 58 | | | 42 | | 2000 cp |
| Ex3 | 58 | | 36 | | 6 | 7500 cp |
| Ex.4 | 40 | 18 | 30 | | 12 | 5500 cp |
| CEx.2 | 58 | | 42 | | | 9500 cp |

The Isocyanate Components prepared in Examples (Ex.) 1 to 4 and Comparative Examples (CEx.) 1 to 2 were mixed with MF C99 (the Polyol Component B) to form the adhesive, with the NCO/OH index being kept at a constant level (stoichiometrically equivalent amount).

Laminates were prepared with these adhesives in a Labo-Combi 400 machine from Nordmeccanica under the following processing conditions: line speed was set as 120 mpm and 150 mpm, temperature of transfer roller was 45° C., nip temperature was set as 60° C., and coating weight was set as 1.8 gsm. Different substrates were selected to form PET/PE25, PET/PE60 and PET/MPET as testing laminate structures, which were characterized with the following technologies.

Test Methods
Bond Strength (BS)

Laminates prepared with the adhesive compositions, a PET substrate and a PE60 substrate were cut into 15 mm width strips for T-peel test under 250 mm/min crosshead speed using a 5940 Series Single Column Table Top System available from Instron Corporation. During the test, the tail of each strip was pulled slightly by fingers to make sure the tail remained 90 degree to the peeling direction. Three strips for each sample were tested and the average value was calculated. Results were represented with the unit of N/15 mm. A higher value represents a better the bond strength.

Heat Seal Strength (HS)

Laminates prepared with the adhesive compositions, a PET substrate and a PE60 substrate were heat-sealed in a HSG-C Heat-Sealing Machine available from Brugger Company under 140° C. seal temperature and 300N pressure for 1 second, then cooled down and cut into 15 mm width strips for heat seal strength test under 250 mm/min crosshead speed using a 5940 Series Single Column Table Top System available from Instron Corporation. Three strips for each sample were tested and the average value was calculated. Results were represented with the unit of N/15 mm. A higher value represents a better heat seal strength.

COF Test

Freshly laminated films (prepared with the adhesive compositions, a PET substrate and a PE25 substrate) was heated in an oven at 45° C. for 24 hrs, then taken out and cooled down, then cut into 64 mm×64 mm and 10 cm×10 cm strips. The 64 mm×64 mm strip was stuck onto the slider and the 10 cm×10 cm strip was stuck onto the machine platform, make sure the PE side of two strips are face to face contacted to provide friction value. The COF machine was calibrated before testing. Three strips were tested for each sample and the average value was calculated.

Optical Appearance Evaluation

Optical appearance of PET ink/MPET laminates was evaluated visually. The adhesive was coated on a printed PET film, a MPET film was applied onto the adhesive layer, and then the laminate was cured at 40° C. overnight. The optical appearance of the laminates was checked visually and rated according to the following criterion:

Good: no orange peel, no bubble, no white spot and no wrinkle observed;
Poor: many defects, e.g. bubble, white spot, wrinkle or orange peel, can be visually observed.

The characterization results were summarized in Table 3.

TABLE 3

Characterization Results

| | COF performance results on PET/PE25 | | PET/PE60 | | Optical appearance |
|---|---|---|---|---|---|
| | 1 d @ 45 C. | 1 d @ 45 C. + 1 d RT | BS | HS | for PET ink/MPET |
| Ex.1/C99 | 0.387 | 0.196 | 2.3 | 51 | Good @ 120 mpm |
| Ex.2/C99 | 0.356 | 0.189 | 2.2 | 50 | Good @ 120 mpm |
| CEx.1/C99 | 0.424 | 0.248 | 2.2 | 51 | Poor @ 120 mpm |
| Ex.3/C99 | 0.206 | 0.125 | 2.4 | 51 | Good @ 150 mpm |
| Ex.4/C99 | 0.198 | 0.120 | 2.3 | 52 | Good @ 150 mpm |
| CEx.2/C99 | 0.279 | 0.146 | 2.5 | 53 | Poor @ 150 mpm |

It can be seen From Table 3 that the inventive examples comprising Ymer N120 show decreased viscosity, better COF performance, improved optical appearance over the comparative examples having no Ymer N120, while retaining a comparable mechanical strength (BS and HS).

What is claimed is:

1. A solventless adhesive composition, comprising:
(A) an isocyanate component comprising a prepolymer which is derived from the reaction of
(i) one or more isocyanate compounds comprising at least two isocyanate groups with (ii) one or more first isocyanate-reactive compounds having at least two isocyanate-reactive groups and at least one side chain represented by Formula I

$$-R_2-(O-R_1-O)_n-R_3 \quad \text{Formula I}$$

wherein $R_1$ represents a $C_2$ to $C_4$ alkylene group, $R_2$ is a $C_1$ to $C_6$ alkylene group, and $R_3$ is a $C_1$ to $C_6$ alkyl; and n is an integer of 8 to 25, and (iii) one or more second isocyanate-reactive compounds having at least two isocyanate-reactive groups and not having the side chain represented by Formula I, the second isocyanate-reactive compound selected from the group consisting of a polyester polyol, a polyether polyol, and combinations thereof;

wherein the prepolymer comprises at least two free isocyanate groups and (A)(i), (A(ii), and (A)(iii) amount to 100 wt % of the isocyanate component (A); and (B) an isocyanate-reactive component comprising one or more third isocyanate-reactive compounds having at least two isocyanate-reactive groups, wherein the third isocyanate-reactive compound is different from the first isocyanate-reactive compound.

2. The solventless adhesive composition according to claim 1, wherein the one or more isocyanate compounds having at least two isocyanate groups are selected from the group consisting of $C_4$-$C_{12}$ aliphatic polyisocyanates comprising at least two isocyanate groups, $C_6$-$C_{15}$ cycloaliphatic or aromatic polyisocyanates comprising at least two isocyanate groups, $C_7$-$C_{15}$ araliphatic polyisocyanates comprising at least two isocyanate groups, carbodiimide modified isocyanates, and a combination thereof.

3. The solventless adhesive composition according to claim 1, wherein the first isocyanate-reactive compounds are polyols having a side chain represented by Formula I.

4. The solventless adhesive composition according to claim 1, wherein the first isocyanate-reactive compound is represented by Formula II:

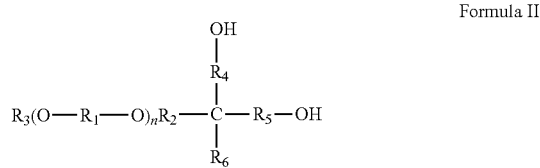

Formula II wherein $R_1$ represents a $C_2$ to $C_3$ alkylene group, $R_2$ is a $C_1$ to $C_3$ alkylene group, $R_3$ is a $C_1$ to $C_3$ alkyl; n is an integer of 9 to 22; $R_4$ and $R_5$ independently represent a $C_1$ to $C_4$ alkylene group; and $R_6$ represents a $C_1$ to $C_6$ alkyl group.

5. The solventless adhesive composition according to claim 1, wherein the content of the first isocyanate-reactive compound is from 6 wt % to 20 wt %, based on the total weight of the isocyanate component (A).

6. The solventless adhesive composition according to claim 1, wherein the second isocyanate-reactive compound and the third isocyanate-reactive compound are independently selected from the group consisting of polyester polyols having a molecular weight from 500 to 5,000 g/mol, polyether polyols having a molecular weight from 200 to 5,000 g/mol, a blend of said polyester polyols and polyether polyols, and a combination thereof.

7. The solventless adhesive composition according to claim 1, wherein the (B) isocyanate-reactive component optionally comprises a fourth isocyanate-reactive compound which is identical with the first isocyanate-reactive compound.

8. A laminate product comprising at least two substrates and an adhesive layer sandwiched therebetween, wherein the adhesive layer is formed by the reaction between the (A) isocyanate component and the (B) isocyanate-reactive component of the solventless adhesive composition according to claim 1.

9. A process for preparing the laminate product of claim 8, comprising the steps of:
providing the solventless adhesive composition according to claim 1;
applying the solventless adhesive composition onto a surface of a first substrate to form an adhesive layer;
applying a second substrate onto a surface of the adhesive layer opposite the first substrate to form a laminate; and
curing the whole laminate.

10. The solventless adhesive composition according to claim 1 wherein the second isocyanate reactive compound consists of a polyester polyol.

11. The solventless adhesive composition of claim 10 wherein the isocyanate compound consists of an aromatic isocyanate.

12. The solventless adhesive composition according to claim 1 wherein the second isocyanate reactive compound consists of a polyether polyol with a poly(alkylene oxide) included in the main chain and terminated with at least two hydroxyl groups.

13. The solventless adhesive composition of claim 12 wherein the isocyanate compound consists of an aromatic isocyanate.

* * * * *